(12) United States Patent
Olateru et al.

(10) Patent No.: US 8,555,865 B2
(45) Date of Patent: Oct. 15, 2013

(54) FUEL CAP BREATHER APPARATUS

(75) Inventors: Isaiah I. Olateru, Peoria, IL (US);
Mark T. Allott, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 397 days.

(21) Appl. No.: 12/877,750

(22) Filed: Sep. 8, 2010

(65) Prior Publication Data
US 2012/0055454 A1  Mar. 8, 2012

(51) Int. Cl.
*B65D 51/16* (2006.01)

(52) U.S. Cl.
USPC ........................................ 123/572; 220/203.1

(58) Field of Classification Search
USPC ............ 220/203.1, 203.24, 203.28, 270, 562, 220/203.01; 123/572–574
See application file for complete search history.

(56) References Cited

U.S. PATENT DOCUMENTS

| | | | |
|---|---|---|---|
| 2,675,886 A | 4/1954 | McMullen | |
| 3,167,416 A | 1/1965 | Humbert, Jr. et al. | |
| 3,465,912 A | 9/1969 | Fleming et al. | |
| 3,918,606 A * | 11/1975 | Keller | 220/203.19 |
| 4,337,875 A | 7/1982 | Lyons | |
| 4,476,995 A | 10/1984 | Bellino et al. | |
| 4,696,409 A | 9/1987 | Vize | |
| 5,914,415 A * | 6/1999 | Tago | 55/385.4 |
| 6,015,444 A | 1/2000 | Craft et al. | |
| 6,866,056 B1 | 3/2005 | Scott | |
| 6,910,589 B1 * | 6/2005 | Rose et al. | 210/484 |
| 2002/0170690 A1 * | 11/2002 | Buchsel et al. | 162/109 |
| 2008/0000543 A1 | 1/2008 | Iwami | |
| 2008/0000906 A1 * | 1/2008 | Nicosia et al. | 220/304 |
| 2009/0294450 A1 * | 12/2009 | Schmalz et al. | 220/371 |
| 2011/0083772 A1 * | 4/2011 | Whelan et al. | 141/369 |

FOREIGN PATENT DOCUMENTS

FR  2713158  6/1995
WO  WO 2004/080570 A1  9/2004

* cited by examiner

*Primary Examiner* — M. McMahon
(74) *Attorney, Agent, or Firm* — Miller, Matthias & Hull (57) ABSTRACT

An improved breather apparatus for use on fuel tanks is disclosed. The breather apparatus may include a mounting base including a valve seat and at least one venting cavity, a valve mounted on the valve seat, and a cover operatively associated with the mounting base. The cover may include at least one venting cavity connected to the venting cavity of the mounting base. The breather apparatus may also include an air filter operatively connected to the valve. Methods of assembling and using the disclosed breather apparatus are also disclosed.

14 Claims, 6 Drawing Sheets

FUEL CAP BREATHER APPARATUS

BACKGROUND

1. Technical Field

This disclosure generally relates to a breather apparatus for venting a container and, more particularly, relates to a breather apparatus with relatively compact dimensions and improved performance and durability.

2. Description of the Related Art

Breather apparatus for venting fuel tanks are known in the art. The breather apparatus may include a check valve mounted on the top wall or top opening of the tank. The check valve may be actuated either manually or automatically when the pressure within the fuel tank reaches above or drops below predetermined threshold values. For example, as fuel vapor accumulates within the tank, the pressure may rise to above a threshold high value and the valve may be actuated to release some of the fuel vapor to the outside air for safety purpose. On the other hand, when the pressure within the tank drops below a threshold low value (usually a negative pressure), the valve may be actuated to draw outside air into the tank so that desirable pressure is maintained for proper fuel delivery.

In order to mount the valve on the fuel tank, the breather apparatus may include a valve plate with a valve seat to accommodate a valve body releasably mounted thereon. A valve gasket is provided to seal the valve body against the valve plate. However, the gasket may deteriorate or fail over time, causing fuel or air leakage around the valve plate.

Moreover, some breather apparatus include an air filter operatively connected to the valve to prevent harmful particles from entering the tank. The air filters are generally cylindrical or annular blocks of porous material dimensioned to fit into the usually compact breather apparatus. However, such air filters are generally limited in filtration capacity and are prone to clogging, frequently inspection is required maintenance to ensure its optimal performance.

Finally, some breather apparatus include a cover to protect the valve. The covers generally have a top or side opening in fluid communication with the valve to allow the air and fuel vapor to enter or exit the fuel tank. However, as the cover is exposed to natural elements, dirt, mud or debris can accumulate around the cover and block the top opening, requiring immediate service to remove the blockage.

Instead of top or side vent openings on the cover, some breather apparatus include covers without any opening. To provide fluid passageways in and out of the breather apparatus, the cover may include a sidewall that surrounds, but does not engage, a sidewall of the valve plate to cooperatively define an annular space therebetween for venting purposes. However, the relatively large annular vent opening may allow large particles to be drawn into the breather apparatus and clog the air filter, the valve, or both.

SUMMARY OF THE DISCLOSURE

An improved breather apparatus for use on fuel tanks is disclosed. In one embodiment, the breather apparatus may include a mounting base having a valve seat and at least one venting cavity, a valve mounted on the valve seat, and a cover operatively associated with the mounting base. The cover may include at least one venting cavity connected to the venting cavity of the mounting base.

In another embodiment, the breather apparatus may include a mounting base having an integrated valve, a cover operatively associated the mounting base to form a housing, and an air filter disposed within the housing. The air filter may be operatively connected to the valve. The housing may include at least one venting channel formed between the cover and mounting base.

A fuel cap incorporating the breather apparatus is also disclosed. The fuel cap may include a base plate and a breather apparatus mounted on the base plate. The base plate includes a breather opening and is adapted to sealingly close a fuel tank. The breather apparatus includes a mounting base having a mounting plate and a sidewall upwardly extending from the mounting plate. The mounting plate includes a valve seat and the sidewall of the mounting base includes at least one venting opening. The breather apparatus may further include a valve mounted on the valve seat and a cover operatively associated with the mounting base. The cover includes a top plate and a sidewall downwardly extending from the top plate. The sidewall of the cover includes at least one venting groove connected to the venting opening of the mounting base.

Other advantages and features of the disclosed breather apparatus and method of use thereof will be described in greater detail below. It will also be noted here and elsewhere that the apparatus or method disclosed herein may be suitably modified to be used in a wide variety of applications by one of ordinary skill in the art without undue experimentation.

BRIEF DESCRIPTION OF THE DRAWINGS

For a more complete understanding of the disclosed apparatus and method, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed apparatus or method which render other details difficult to perceive may have been omitted. It should be understood, of course, that this disclosure is not limited to the particular embodiments illustrated herein.

DETAILED DESCRIPTION OF THE DISCLOSURE

Figure 1:
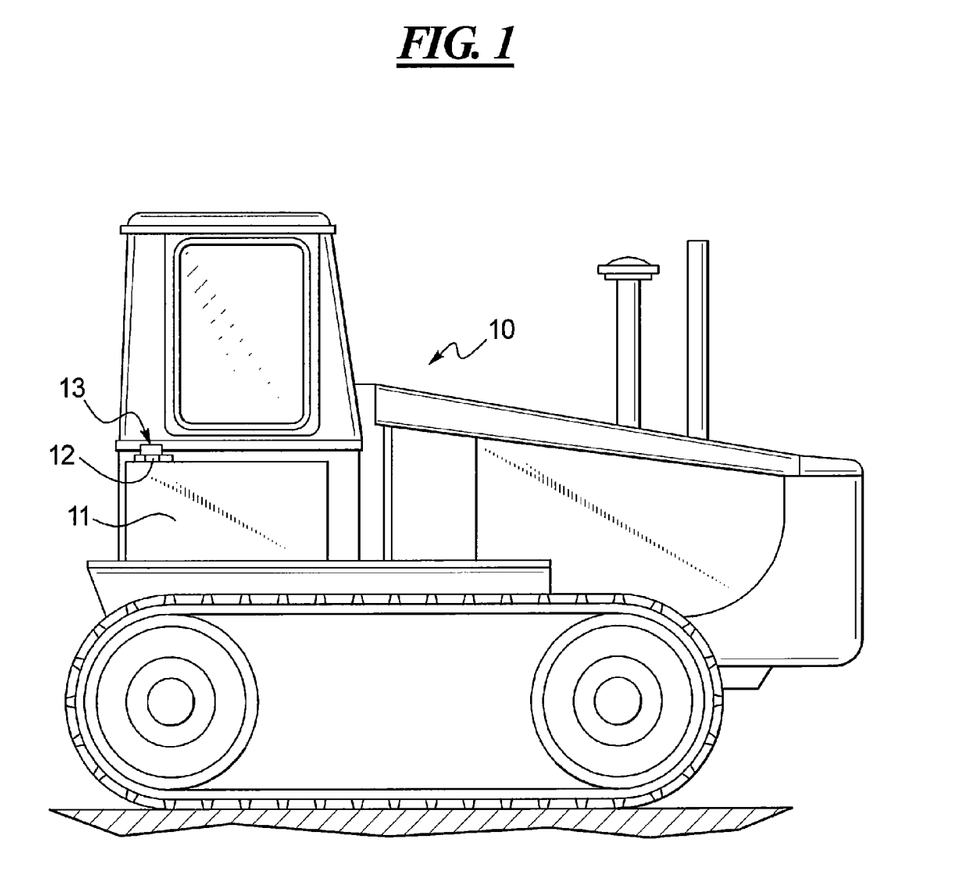
FIG. 1 is a schematic view of a breather apparatus mounted on a fuel cap of a vehicle according to one aspect of this disclosure.

Breather apparatus for venting a container, such as a fuel tank, are disclosed. Referring now to FIG. 1, a vehicle 10 (e.g. a tractor) is shown as having a fuel tank 11 sealingly closed by a fuel cap 12. A breather apparatus 13 is mounted on the fuel cap 12 for venting purposes, as described in greater detailed below.

Figure 2:
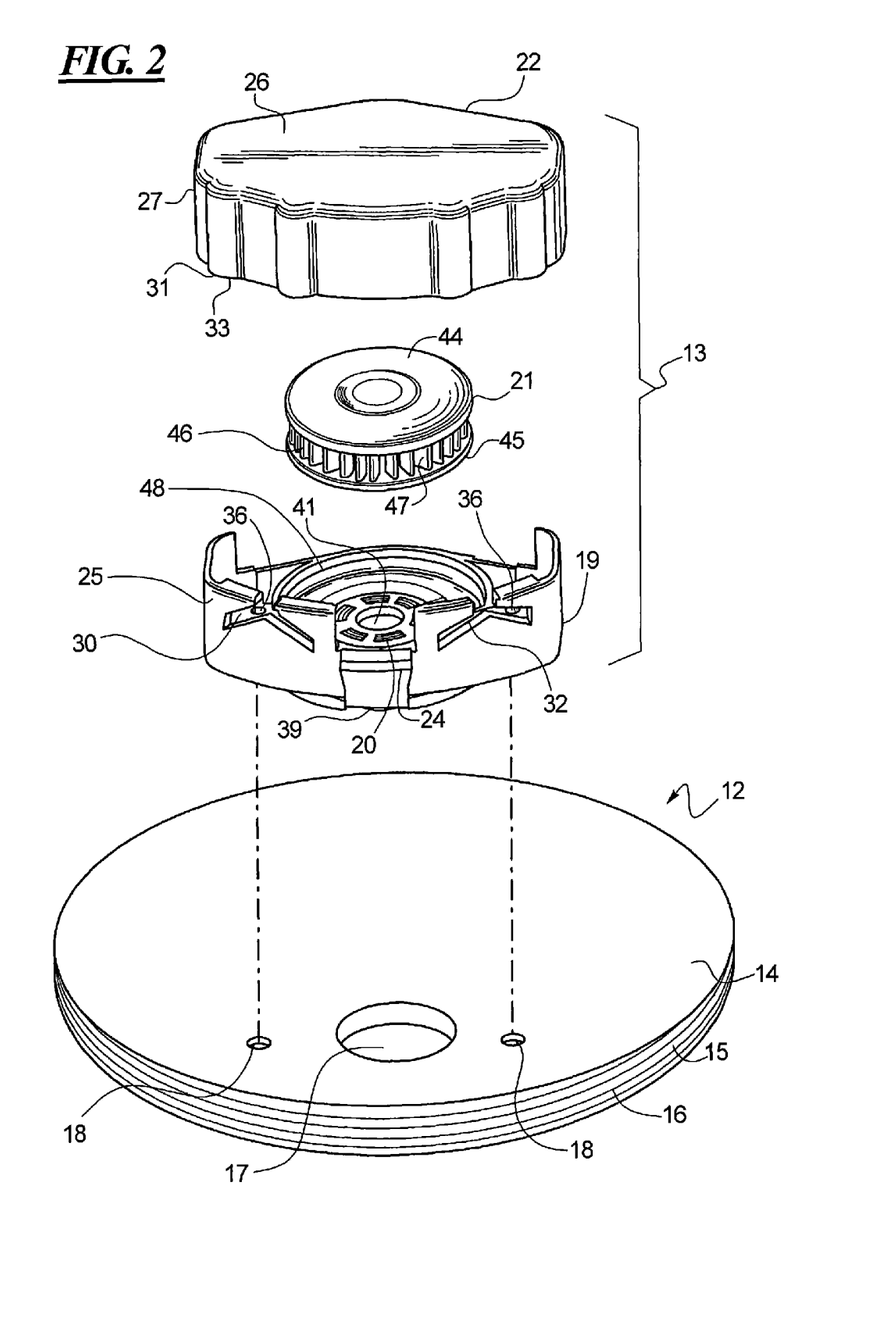
FIG. 2 is an exploded view of the breather apparatus and fuel cap in FIG. 1, showing the cover, air filter, valve, and mounting base of the breather apparatus.

Turning to FIG. 2, the fuel cap 12 includes a base plate 14 and a sidewall 15 extending from the base plate 14. The sidewall 15 may include exterior or interior threads 16 for releasable attachment of the fuel cap 12 to the fuel tank 11. The fuel cap 12 may also be releasably attached to the fuel tank 11 through other attachment mechanisms, such as snap fit, interference fit, etc. When it is desired to fill the fuel tank 11, the fuel cap 12 can be rotatably or otherwise removed and reattached when the fuel tank 11 is full.

The base plate 14 of the fuel cap 12 may include a breather opening 17 and one or more threaded mounting holes 18, on which the breather apparatus 13 is mounted to adjust or maintain desirable pressure in the head space of the fuel tank. When the pressure within the tank reaches or exceeds a predetermined or threshold high value, the breather apparatus may be actuated, either manually or automatically, to release some of the air-fuel vapor mixture from the tank. On the other hand, if the pressure within the tank drops below a predetermined or threshold low value, the breather apparatus may be actuated, either manually or automatically, to allow outside air to enter the tank so that the pressure is restored to within the desirable range, i.e. between the high and low values. Although the breather apparatus 13 is shown to be mounted on the fuel cap 12 in FIGS. 1-2, it is to be understood that this configuration should not be interpreted as limiting the scope of this disclosure as the breather apparatus 13 may be mounted directly on the top or side walls of the fuel containers in other embodiments of this disclosure.

As illustrate in FIG. 2, the breather apparatus 13 includes a mounting base 19, a valve 20, an air filter 21, and a cover 22. The mounting base 19 may include a mounting plate 24 and a sidewall 25 upwardly extending from the mounting plate 24. The cover 22 may include a top plate 26 and a sidewall 27 downwardly extending from the top plate 26 and releasably engaging the sidewall 25 of the mounting base 19. The cover 22 may be snap-fitted onto the mounting base 19 by one or more clips, retainers, hooks (not shown), or by interference fit between the sidewalls (25, 27). Alternatively, the cover 22 may be secured to the mounting base 19 by one or more screws or other fasteners.

Figure 3:
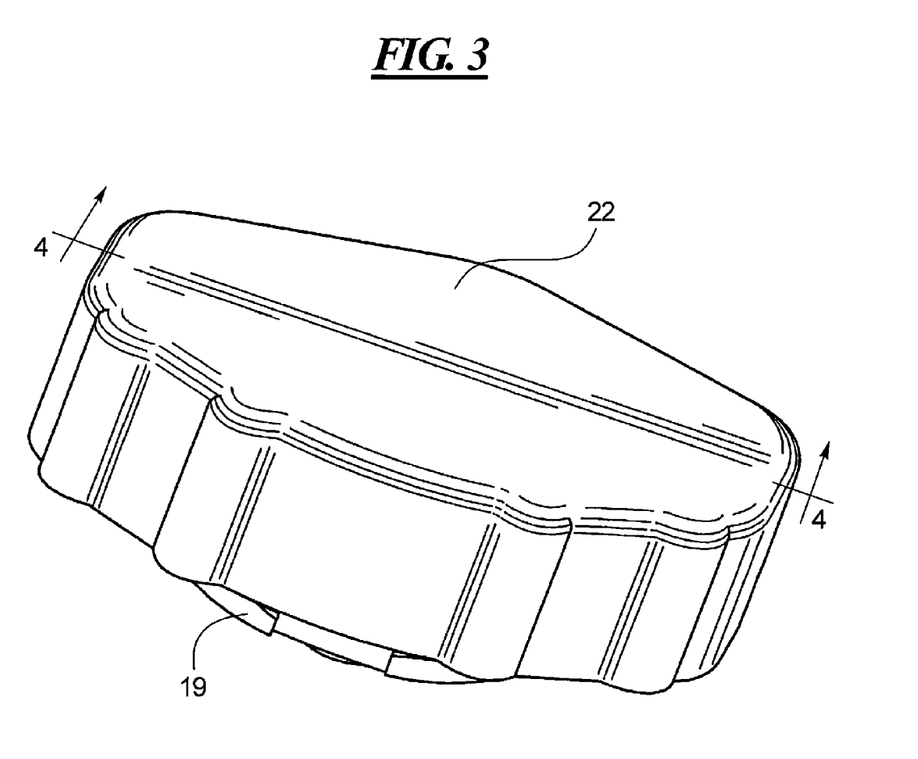
FIG. 3 is a perspective view of the breather apparatus in FIG. 2 in an assembled state.
Figure 4:
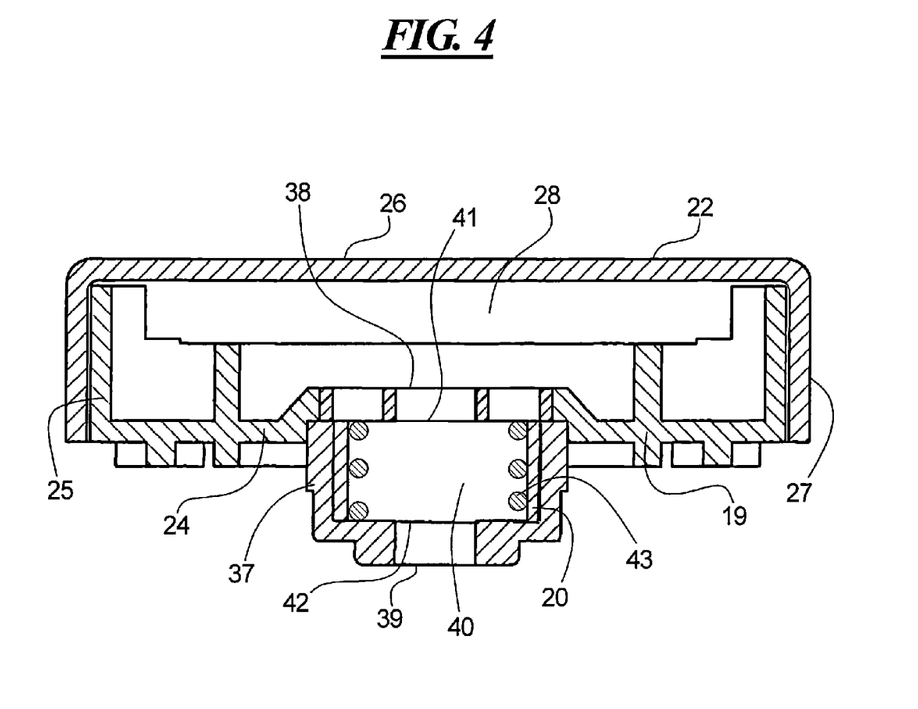
FIG. 4 is a cross sectional view of the breather apparatus in FIG. 3 (without the air filter for better viewing), taken along line 4-4 of FIG. 3.

As illustrated in FIGS. 3-4, the mounting base 19 and cover 22 may cooperatively form a breather housing 28 in which the valve 20 and air filter 21 are enclosed. In order to provide secure and constant fluid communication between the breather housing 28 and the outside air, the breather apparatus 13 may include at least one venting channel 29 formed between the mounting base 19 and cover 22, as illustrated in greater detail in FIG. 5. Referring back to FIG. 2, the mounting base 19 may have at least one venting cavity 30 that is configured to be connected to at least one venting cavity 31 provided on the cover 22. As used in this disclosure, the term "cavity" refers to any unfilled or hollowed-out space that is formed on the mounting base 19 (or on the cover 22), instead of being cooperatively defined by the mounting base 19 (or cover 22) and other structural components. For example, openings or grooves on the mounting base 19 and cover 22 are cavities whereas an annular space defined between two concentric annular walls is not a cavity for purpose of this disclosure. Moreover, two cavities are "connected" to each other when the cavities are in direct fluid communication with each other without any void space between the cavities.

Still referring to FIG. 2, the venting cavity 30 of the mounting base 19 may be at least one transverse venting opening 32 provided on the sidewall 25 of the mounting base 19. The venting opening 32 may be circular, oval, triangular, square, rectangular, or of other shapes suitable for venting fluid in and out of the breather housing 28. The venting cavity 31 of the cover 22, on the other hand, may be at least one venting groove 33 provided on the interior surface of the sidewall 27 of the cover 22, as illustrated in greater detail in FIG. 5. The cross-section of the venting grooves 33 may be semicircular, square, triangular, semi-oval, or of other shapes suitable for venting fluid in and out of the breather housing 28. In the non-limiting embodiment illustrated in FIG. 2, the venting opening 32 is inverse V-shaped with its two ends connected to two vertical venting grooves 33 provided on the sidewall 27 of the cover 22.

Figure 5:
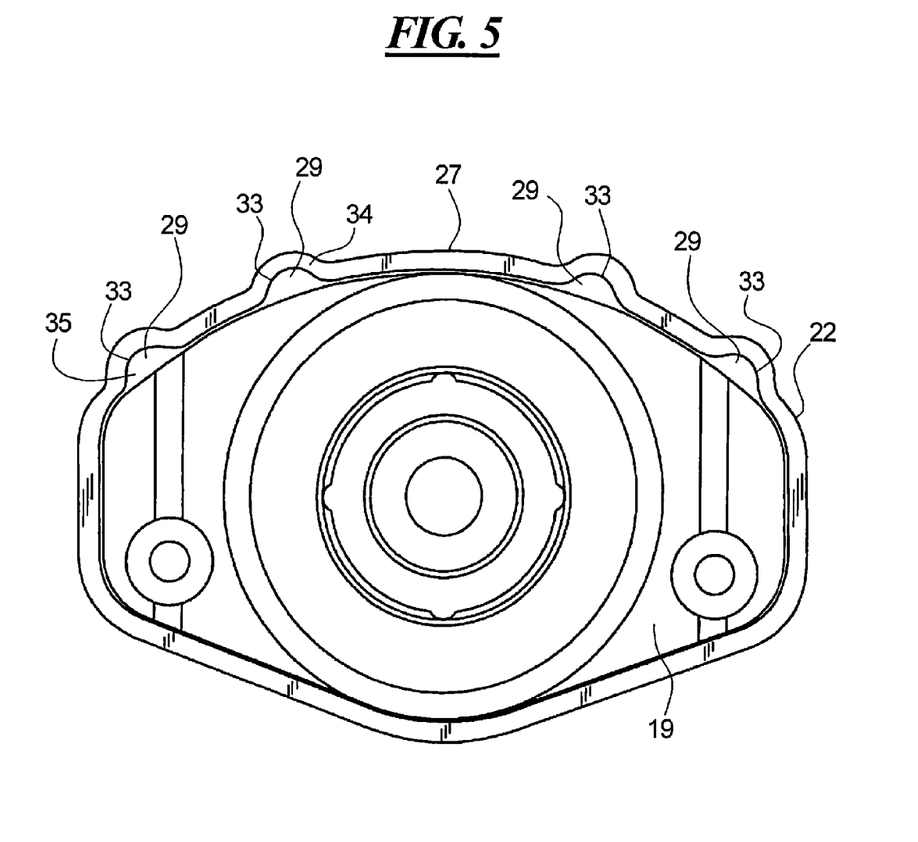
FIG. 5 is a bottom view of the breather apparatus in FIG. 3, showing the venting channel formed between the cover and mounting base.

As illustrated in FIG. 5, the venting groove 33 downwardly terminates in a lower end 34 of the sidewall 27 to provide a venting outlet 35 to the venting channel 29. As the downwardly facing venting outlet 35 is substantially shielded from the natural elements by the cover 22, blockage of the venting channel 29 by dirt, debris, dust, mud, rain, snow, or other matters may be prevented or detected, allowing the breather apparatus 13 to operate under more severe conditions with significantly increased service intervals (e.g. from 60-300 hours to 500-1000 hours). The inventors have determined that by directly coupling the venting opening 32 to the venting groove 33, the venting channel 29 thus formed allows efficient and adequate fluid passage in and out of the breather housing 28 while limiting the amount of larger debris that may enter the breather housing 28 as compared to the annular venting space used in some conventional breather apparatuses discussed in the background section above, an insight and unexpected result heretofore unknown.

Turning back to FIG. 2, the mounting plate 24 of the mounting base 19 may include one or more threaded mounting holes 36 that align with the mounting holes 18 of the fuel cap 12, through which the mounting base 19 may be secured to the fuel cap 12 by one or more fasteners (not shown). As illustrated in FIG. 4, the mounting plate 24 includes a valve seat 37, in which the valve 20 is disposed or integrally formed with the mounting base 19. The valve seat 37 may be a generally cylindrical recessed area provided on the mounting plate 24 that extends between top and bottom openings (38, 39). However, it is to be understood that the shape and structure of the valve seat 37 should not be interpreted as limiting the scope of this disclosure. Moreover, the valve 20 may be integrally formed with the mounting base 19 so as to eliminate the needs of sealing gaskets and/or to prevent any fluid leakage between the valve 20 and valve seat 37 as a result of failed or improperly installed sealing gaskets.

In the non-limiting example illustrated in FIG. 4, the valve 20 is a two-way valve that allows gaseous fluid to pass in both directions depending on pressure differentials. The valve 20 may include a housing 40 with top and bottom openings (41, 42) that align and communicate with the top and bottom openings (38, 39) of the valve seat 37. As a result, the top opening 41 is in fluid communication with outside air and the bottom opening 42 is in fluid communication with the air/fuel vapor mixture within the tank 11. The valve 20 may further include a two-way spring 43 disposed in the housing 40. The spring 43 may be actuated to allow fluid passage from the top opening 41 to the bottom opening 42 when the pressure within the tank drops below a threshold low value. The spring 43 may also be actuated to allow fluid passage from the bottom opening 42 to the top opening 41 when the pressure within the tank reaches or exceeds a threshold high value so as to decrease the pressure within the tank. As a result, the pressure within the fuel tank may be conveniently maintained at a safe and desirable range.

Figure 6:
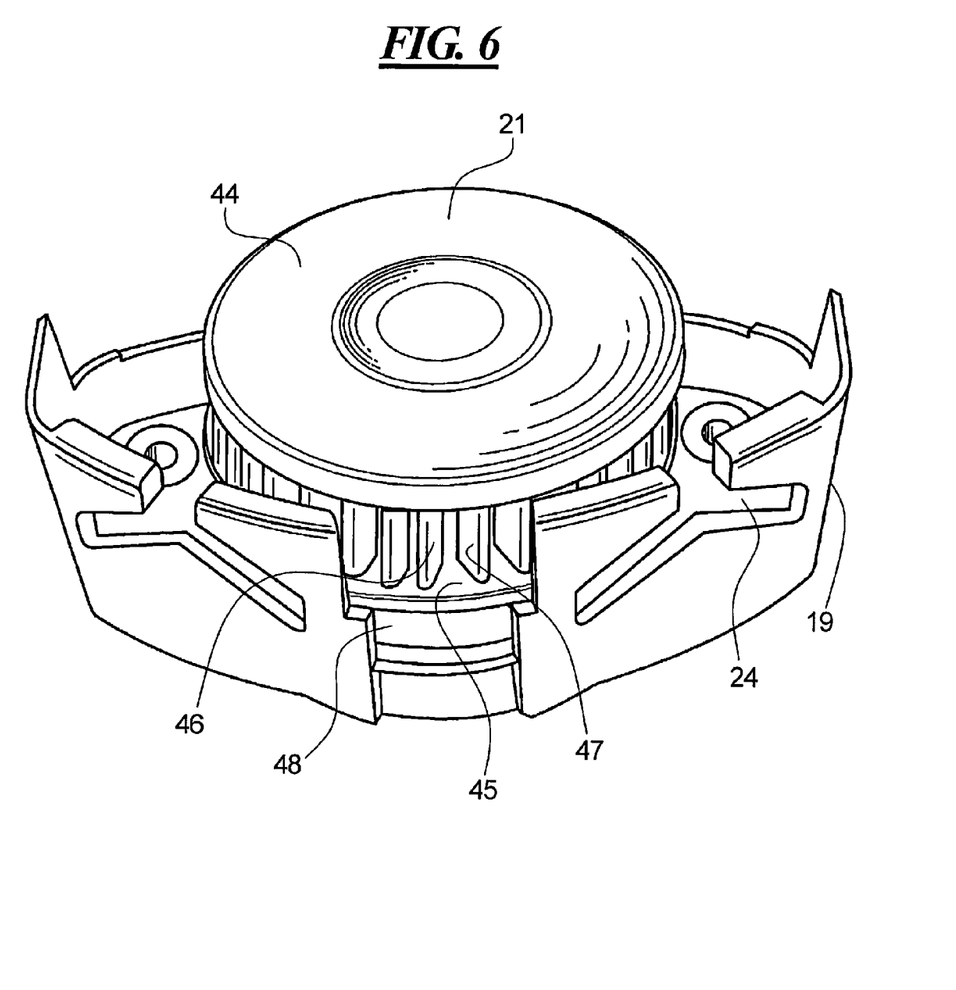
FIG. 6 is a top perspective view of the breather apparatus (without the cover) in FIG. 2, showing the mounting base, valve, and air filter in an assembled state.

Turning back to FIG. 2, to prevent harmful particles in the air to enter the tank and contaminate the fuel contained therein, the breather apparatus 13 may further include an air filter 21 positioned within the breather housing 28 and operatively connected to the valve 20. the air filter 21 may include a top plate 44 connected to a bottom plate 45 through a filter element 46 extending between and sealed against the top and bottom plates (44, 45). The filter element 46 may include a plurality of radially extending pleats 47 that define a center channel (not shown) having a bottom opening in fluid communication with the top opening 41 of the valve 20. As illustrated in FIG. 6, the air filter 21 may be mounted on the mounting base 19 by fitting the bottom plate 45 of the air filter 21 into an annular mounting flange 48 provided on the mounting plate 24 around the valve seat 37 so that the center channel of the air filter 21 aligns with the top opening 38 of the valve seat 37.

The air filter 21 described above is compact in size yet robust in performance. For example, the filter element 46 may have an average pore size of 4 microns and more than 30,000 square millimeters in total surface area. Further, the filter element 46 may include a water-repellant material to prevent moisture from entering into the tank during the venting operation of the breather apparatus 13. One exemplary air filter 21 for used in the disclosed breather apparatus 13 may be obtained from Ahlstrom (Ahlstrom Atlanta LLC, 3820 Mansell Road, Suite 200, GA 30022, USA). The inventors have determined that incorporation of a compact filter element made of water repellant material and including radially extending pleats in the disclosed breather apparatus significantly improves the performance of the filter and increases the service interval (e.g. from 60-300 hours to 500-1000 hours) without the need to expand or modify the dimension of the breather apparatus, another insightful and unexpected result heretofore unknown.

Still referring to FIG. 2, to assemble the breather apparatus 13, the mounting base 19 (with the integrated valve 20 in this non-limiting embodiment) is connected to the air filter 21 by frictionally engaging the bottom plate 45 of the air filter 21 against the mounting flange 48 of the mounting base 19. The mounting base 19 is then place on the fuel cap 12 so that the bottom opening 39 of the valve seat 37 is in fluid communication with the breather opening 17 of the fuel cap 12 and that the mounting holes (18, 36) of the fuel cap 12 and mounting base 19 are aligned with each other. After the mounting base 19 is secured to the fuel cap 12 by fasteners (not shown in the drawings) inserted into the mounting holes (18, 36), the cover 22 is snap-fitted over the mounting base 19 so that the sidewall 27 of the cover 22 engages the sidewall 25 of the mounting base 19 and so that the venting opening 32 is connected to the venting groove 33 to form the venting channel 29. The breather apparatus 13 and fuel cap 12 assembly is then mounted on the fuel tank 11 so that the bottom opening 39 of the valve seat 37 is in fluid communication with the head space of the fuel tank 11 through the breather opening 17 of the fuel cap 12.

As fuel is withdrawn from the fuel tank, the pressure within the tank is gradually decreased. When the pressure within the tank drops below a threshold low value, such as slightly lower than the outside atmospheric pressure (e.g. by 1 kPa or less), the two-way spring 43 of the valve 20 may be actuated to allow outside air to be drawn through the venting channel 29 into the breather housing 28, and thereafter into the fuel tank 11 through the air filter 21, the valve 20, and the breather opening 17. As a result, the pressure within the tank 11 is restored to atmospheric pressure until the fuel withdrawal occurs again and the process repeats itself.

Under some circumstance (e.g. high temperature), the pressure within the fuel tank 11 may increase to above atmospheric pressure. When the pressure within the tank rises to above a threshold high value, usually substantially higher than the outside atmospheric pressure (e.g. by 18 kPa or more), the two-way spring 43 of the valve 20 may be actuated to allow the air and fuel vapor mixture within the fuel tank to be vented into the breather housing 28 through the breather opening 17, the valve 20, and the air filter 21, and thereafter into the outside air through the venting channel 29. As a result, pressure within the fuel tank 11 may be maintained below the threshold high value to ensure safe and effective operation of the fuel tank 11. It is to be understood that the high and low threshold pressure values disclosed above should not be interpreted as limiting the scope of this disclosure.

INDUSTRIAL APPLICABILITY

In general, the present disclosure sets forth a fuel cap and breather apparatus for improved venting of a container so as to maintain desirable pressure within the container. In particular, the breather apparatus is relatively compact in size and robust in performance and durability. Moreover, the breather apparatus includes structural features that increase its service interval (e.g. from 60-300 hours to 500-1000 hours) without the need to expand or modify its dimensions or to sacrifice its performance. Although the breather apparatus in the non-limiting embodiments disclosed herein are used on fuel tanks of vehicles, it may also be used in other pressurized containers where maintenance of pressure within the containers is desired.

While only certain embodiments have been set forth, alternative embodiments and various modifications will be apparent from the above descriptions to those skilled in the art. These and other alternatives are considered equivalents and within the spirit and scope of this disclosure.

What is claimed is:
1. A breather apparatus, comprising:
a mounting base including a valve seat and at least one venting cavity;
a valve mounted on the valve seat; and
a cover operatively associated with the mounting base, the cover including at least one venting cavity connected to the venting cavity of the mounting base;
wherein the venting cavity of the mounting base includes a V-shaped opening and the venting cavity of the cover includes two vertical grooves in fluid communication with two ends of the V-shaped opening.
2. The breather apparatus of claim 1, wherein the mounting base includes a mounting plate and a sidewall upwardly extending from the mounting plate, the valve seat being provided on the mounting plate, the venting cavity of the mounting base being provided on the sidewall of the mounting base.
3. The breather apparatus of claim 2, wherein the venting cavity of the mounting base includes a transverse opening.
4. The breather apparatus of claim 1, wherein the cover includes a top plate and a sidewall downwardly extending from the top plate and terminating into a bottom rim, the venting cavity of the cover being provided on the sidewall of the cover.
5. The breather apparatus of claim 4, wherein the venting cavity of the cover includes a surface groove terminating in the bottom rim of the cover.
6. The breather apparatus of claim 1, wherein the valve and mounting base are integrated into a one-piece structure.
7. The breather apparatus of claim 1, wherein the valve is a two-way pressure actuated valve.

8. The breather apparatus of claim 1, wherein the cover is snap-fitted on the mounting base to form a substantially enclosed housing.

9. A breather apparatus, comprising:
- a mounting base including an integrated valve;
- a cover operatively associated with the mounting base to form a housing, each of the mounting base and the cover defining at least one venting cavity; and
- an air filter disposed within the housing and operatively connected to the valve, the housing including at least one venting channel formed between the cover and mounting base;
- wherein the venting channel opens into the at least one venting cavity of each of the cover and the mounting base, and the venting cavity of the mounting base includes a V-shaped opening and the venting cavity of the cover includes two vertical grooves in fluid communication with two ends of the V-shaped opening.

10. The breather apparatus of claim 9, wherein the venting channel includes a venting opening provided on a sidewall of the mounting base and a venting groove provided on a sidewall of the cover.

11. The breather apparatus of claim 9, wherein the air filter includes a plurality of radially extending pleats made of a water-repellant filter material.

12. The breather apparatus of claim 9, wherein the filter material has an average pore size of about 4 microns.

13. The breather apparatus of claim 9, wherein the valve is a two-way pressure actuated valve.

14. The breather apparatus of claim 9, wherein the cover is snap fitted on the mounting base.

* * * * *